United States Patent
Khan et al.

(10) Patent No.: US 11,475,379 B2
(45) Date of Patent: Oct. 18, 2022

(54) MACHINE LEARNING MODELS OF LIVESTOCK VALUE CHAIN

(71) Applicant: International Business Machines Corporation, Armonk, NY (US)

(72) Inventors: Naweed Aghmad Khan, Johannesburg (ZA); Juliet Mutahi, Nairobi (KE); Lucile Ter-Minassian, London (GB); Francois Pierre Luus, Wierdapark (ZA); Ismail Yunus Akhalwaya, Johannesburg (ZA); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 16/884,746

(22) Filed: May 27, 2020

(65) Prior Publication Data

US 2021/0374640 A1 Dec. 2, 2021

(51) Int. Cl.
*G06Q 10/06* (2012.01)
*G06Q 10/04* (2012.01)
(Continued)

(52) U.S. Cl.
CPC ..... *G06Q 10/06315* (2013.01); *G06K 9/6256* (2013.01); *G06K 9/6267* (2013.01);
(Continued)

(58) Field of Classification Search
CPC ............. G06Q 10/04; G06Q 10/06315; G06K 9/6256; G06K 9/6267; G06N 3/08;
(Continued)

(56) References Cited

U.S. PATENT DOCUMENTS 5,542,431 A   8/1996  Starzl et al.
6,339,999 B1  1/2002  Newell
(Continued)

FOREIGN PATENT DOCUMENTS

BR   112021010091 A2 *  8/2021  ............... A01K 1/01
CN   108875647 A  *  11/2018  ......... G06K 17/0022
(Continued)

OTHER PUBLICATIONS

Herrero et al., "The roles of Livestock in developing countries", International Livestock Research Institute, PO Box 30709, Nairobi, Kenya. First published online on Nov. 5, 2012, Animal 2013, 7:s1, pp. 3-18. (Year: 2013).*

(Continued)

*Primary Examiner* — Pan G Choy
(74) *Attorney, Agent, or Firm* — Scully, Scott, Murphy & Presser, P.C.; Shimon Benjamin

(57) ABSTRACT

Methods and systems for operating a machine learning system are described. In an example, a device can receive an image and assign a set of pixels in the image as a digital representation of a livestock. The device can further train a machine learning model using the digital representation. The device can further run the machine learning model to generate prediction data relating to the livestock. The device can further generate output data relating to at least one activity among a livestock value chain. The at least one activity can correspond to a process to generate a commodity based on the livestock.

20 Claims, 12 Drawing Sheets

(51) Int. Cl.
  *G06N 3/08* (2006.01)
  *G06K 9/62* (2022.01)
  *G06V 10/75* (2022.01)
  *G06V 20/13* (2022.01)
(52) U.S. Cl.
  CPC .............. *G06N 3/08* (2013.01); *G06Q 10/04* (2013.01); *G06V 10/751* (2022.01); *G06V 20/13* (2022.01)
(58) Field of Classification Search
  CPC ...... G06V 10/751; G06V 20/00; G06V 20/13; G06V 40/10
  See application file for complete search history.

(56) References Cited

U.S. PATENT DOCUMENTS

| | | | |
|---|---|---|---|
| 9,084,411 B1* | 7/2015 | McGlone | A01K 11/006 |
| 10,314,293 B2 | 6/2019 | Yajima et al. | |
| 10,354,342 B2 | 7/2019 | Kuper et al. | |
| 10,628,756 B1* | 4/2020 | Kuper | A01K 5/02 |
| 10,952,410 B2* | 3/2021 | Dumm | G01G 23/00 |
| 2003/0219819 A1 | 11/2003 | Marquess | |
| 2004/0093340 A1* | 5/2004 | Edmondson | G06Q 10/10 |
| 2004/0254800 A1 | 12/2004 | Saunders | |
| 2008/0059534 A1* | 3/2008 | Stroman | G06Q 10/08 |
| 2008/0314325 A1 | 12/2008 | Hempstead et al. | |
| 2009/0055243 A1 | 2/2009 | Lusk | |
| 2009/0258030 A1 | 10/2009 | Chi et al. | |
| 2011/0207993 A1 | 8/2011 | Barcelo Rojas | |
| 2012/0288170 A1* | 11/2012 | McVey | G06V 10/42 382/128 |
| 2017/0280687 A1 | 10/2017 | Vrabete et al. | |
| 2018/0049407 A1* | 2/2018 | Castelli | A01K 11/008 |
| 2018/0160649 A1 | 6/2018 | Hicks et al. | |

FOREIGN PATENT DOCUMENTS

| | | | | |
|---|---|---|---|---|
| ES | 2716814 A1 | 6/2019 | | |
| WO | WO-2019058752 A1 * | 3/2019 | ............. | A01K 1/035 |
| WO | WO-2020003310 A1 * | 1/2020 | ............. | A01K 11/006 |

OTHER PUBLICATIONS

Butler et al., "A Value Chain Analysis of ghost nets in the Arafura Sear: Identifying trans-boundary Stakeholders, intervention points and livelihood trade-offs", Journal of Environmental Management 123 (2013), pp. 14-25. (Year: 2013).*
"Smart farming" DairyGlobal, Dec. 14, 2017, 5 pages.
Keates, O., "The design and validation of a process data analytics methodology for improving meat and livestock value chains", Published Date: Sep. 6, 2019, 5 pages.
Jo, S. K., et al., "Smart Livestock Farms Using Digital Twin: Feasibility Study", ICTC 2018, Published Date: Oct. 19, 2018, pp. 1461-1463.
Arrowquip, "Selecting The Right Cattle Feed Plans", Published Date: Jun. 6, 2017, 8 pages, https://arrowquip.com/blog/animal-science/cattle-feed-plan.
Verdouw, C. N., et al., "Digital twins in farm management: illustrations from the FIWARE accelerators SmartAgriFood and Fractals", PA17—The International Tri-Conference for Precision Agriculture in 2017, Oct. 2017, 6 pages.

* cited by examiner

MACHINE LEARNING MODELS OF LIVESTOCK VALUE CHAIN

BACKGROUND

The present disclosure relates in general to a machine learning system that can train and run machine learning models to operate a livestock value chain environment.

A livestock value chain can be referred to as a chain of activities and/or processes to produce and deliver commodities based on a livestock (e.g., domesticated animals or creatures). These processes can include, for example, production, processing and delivery. These processes can be carried out by a plurality of entities, such as farmers, breeders, abattoirs, and the consumers.

SUMMARY

In some examples, a method for operating a machine learning system is generally described. The method can include receiving an image. The method can further include assigning a set of pixels in the image as a digital representation of a livestock. The method can further include training a machine learning model using the digital representation. The method can further include running the machine learning model to generate prediction data relating to the livestock. The method can further include generating output data relating to at least one activity among a livestock value chain. The at least one activity can correspond to a process to generate a commodity based on the livestock.

In some examples, a system implemented as a machine learning system is generally described. The system can include a memory and a processor configured to be in communication with the memory. The processor can be configured to receive an image. The processor can be further configured to assign a set of pixels in the image as a digital representation of a livestock. The processor can be further configured to train a machine learning model using the digital representation. The processor can be further configured to run the machine learning model to generate prediction data relating to the livestock. The processor can be further configured to generate output data relating to at least one activity among a livestock value chain. The at least one activity can correspond to a process to generate a commodity based on the livestock.

In some examples, a computer program product for operating a machine learning system is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

In some examples, livestock value chain processes and activities can be carried out by entities manually, and may require physical observations and analysis. Further, these processes can sometimes be affected by conditions relating to, for example, weather, air quality, economy, epidemic, and/or other events. In an example, entities such as farmers may not be able to predict a market (e.g., supply and demand) of livestock, livestock epidemics, or may not ascertain the growth of the livestock precisely. In another example, entities such as breeders may not be able to predict heat levels of livestock corresponding to milk or protein production stages, and timing required between standing heat and ovulation. In another example, abattoirs may have difficulty obtaining livestock health information from other entities in the livestock value chain, such as farmers, due to scattered locations other communication issues. In another example, consumers of products may demand complete traceability of the livestock value chain in order to ease concerns on issues such as environmental impact of meat consumption, quality, and ethics of the products.

The methods and systems described in accordance with the present disclosure can provide digitization of livestock through digital representations of livestock, such as an image of the livestock. The digital representations can be used for modeling the livestock value chain processes. For example, a machine leaning system can use the digital representations to train a machine learning model to learn a degree of abattoir readiness of the livestock. In another example, a machine leaning system can use the digital representations to train another machine learning model to learn a supply and demand forecasting model that can incorporate environmental footprint of products (e.g., meat, dairy, and/or other products relating to the livestock represented by the digital representations). The trained machine learning models can be run by a processor to provide predicted inputs to a decision making tool or application.

The decision making tool can be configured to output various data such as a feeding plan for livestock, amount of livestock to maintain in the supply chain, distribution of livestock among multiple locations, and/or other decisions relating to the livestock value chain.

Figure 1:
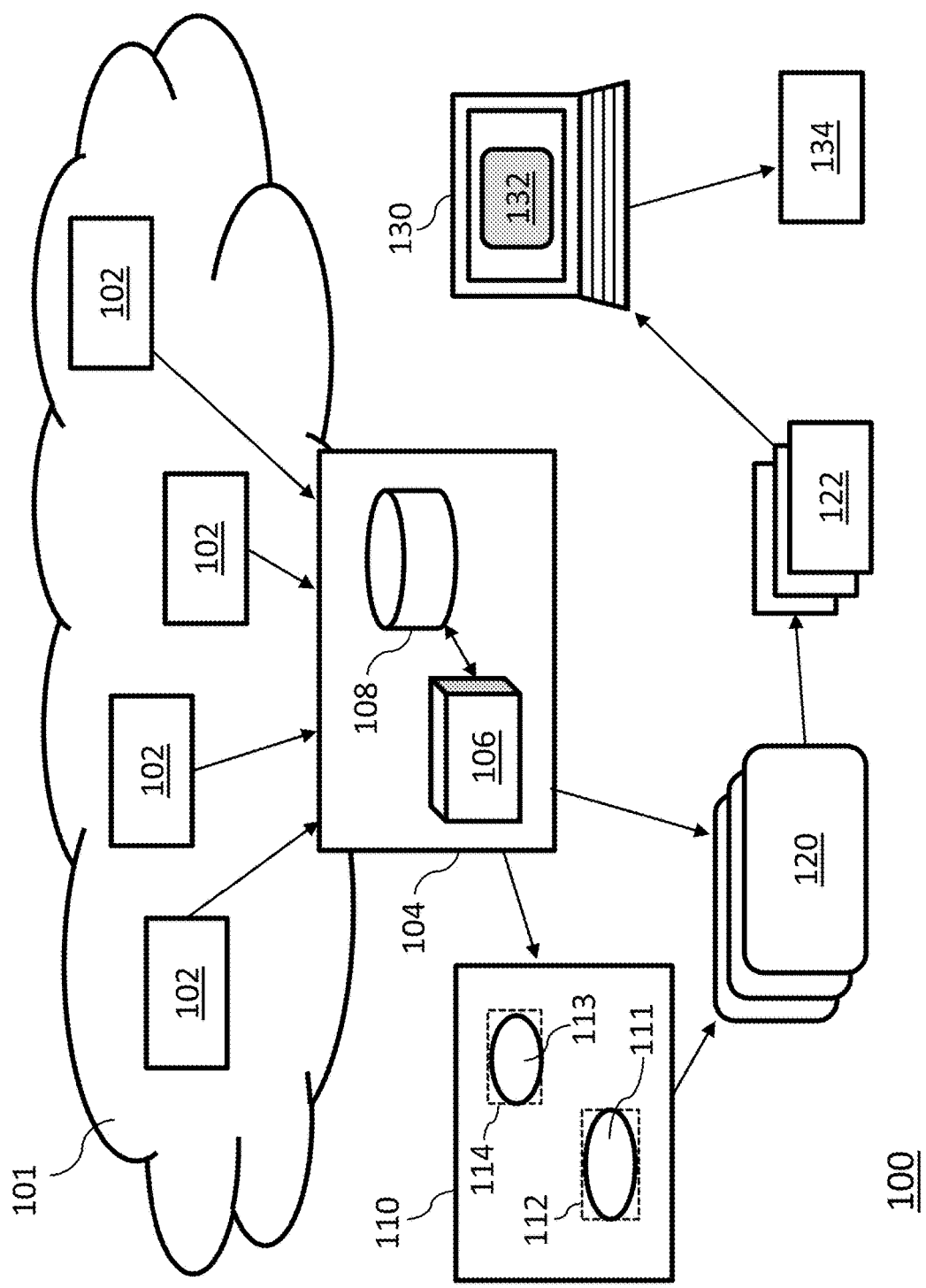
FIG. 1 is a diagram showing an example system that can implement machine learning models of livestock value chain in one embodiment.

FIG. 1 is a diagram showing an example system 100 that can implement machine learning models of livestock value chain in one embodiment. The system 100 can include one or more data sources 102, a device 104, and a device 130. Note that although four data sources 102 are shown in the example of FIG. 1, the number of data sources in the system 100 can be arbitrary and can be dependent on a desired implementation of the system 100. The device 104 can be, for example, a server, a computer, and/or other types of computing devices. The device 104 can be configured to be in communication with the data sources 102 and the device 130 through a network 101. The network 101 can be, for example, the Internet, a cellular network, and/or other types of wired or wireless network. In an example, the device 104 can be a component of a cloud computing network, such as a processor configured to collect various types of data from the data sources 102 using the network 101.

The device 104 can include at least a processor 106 and a memory 108. The processor 106 can be, for example, a central processing unit (CPU) of the device 104, a multi-core processor, a microprocessor, and/or other types of processing units of a computing device. The memory 108 can be, for example, a memory device including volatile and/or non-volatile memory elements. The processor 106 can be configured to use the data collected by the device 104, from the data sources 102, to generate digital representations (e.g., digital image and corresponding data) of one or more creatures among a livestock. The processor 106 can use the generated digital representations to train one or more machine learning models 120 relating to a livestock supply value chain. The processor 106 can further run the trained machine learning models 120 to generate prediction data 122, where the prediction data 122 relates to predictions on one or more aspects of the livestock supply value chain. The device 104 can send the generated prediction data 122 to the device 130. The device 130 can be configured to run an application 132 using the prediction data 122 to generate output data 134, where the output data 134 can include information and instructions relating to processes and activities of the livestock supply value chain.

In some examples, the data sources 102 can include weather data, global positioning system (GPS) data, radio frequency identification (RFID) data, images, health records data of livestock, profiles of entities in the livestock value chain (e.g., farmers profiles), Internet of things (IoT) data, and/or other types of data that can be obtained by the device 104 over the network 101. In some examples, the device 104 can obtain data from the data sources 102 by interacting or using application program interfaces (APIs). For example, the device 104 can collect weather data from a weather-related API. Weather data being collected by the device 104 can be, for example, weather data relating to future and/or historical weather forecast at one or more geographical locations. GPS data being collected by the device 104 can be, for example, data (e.g., coordinates) indicating current and/or historical locations and movements of livestock at one or more geographical locations. RFID data being collected by the device 104 can be, for example, data from RFID tags being equipped or attached on the livestock that can be used to identify and track livestock. Health records data being collected by the device 104 can be, for example, data obtained from veterinarian office and corresponding databases.

In an example, the device 104 can receive images, such as satellite and/or digital images of a livestock having a plurality of domesticated animals or creatures. In an example shown in FIG. 1, the device 104 can receive an image 110 from one or more devices among data sources 102, having images of one or more livestock, such as livestock 111 and 113. The processor 106 can be configured to execute image processing algorithms to generate a digital twin, or a digital representation, of livestock being shown in the image 110. For example, the processor 106 can identify a set of pixels 112 as a digital representation of the livestock 111, and identify a set of pixels 114 as a digital representation of the livestock 113. The sets of pixels 112 and 114 can form digital images resembling respective livestock, and the processor 106 can store the digital images in the memory 108. The processor 106 can analyze the sets of pixels 112, 114 to extract one or more features of the livestock in the image 110, such as appearance (e.g., fur shade patterns), height, weight, shape, and/other features. In another example, the image 110 received by the device 104 can be an infrared image, and the pixels 112 and 114 can be thermal pixels indicative of temperatures at different portions of one or more livestock, such as livestock 111 and 113, shown in the image 110. The processor 106 can be configured to analyze the sets of thermal pixels 112 and 114 to extract the temperatures of the livestock 111 and 113. The processor 106 can be further configured to associate data received from data sources 102 with the sets of thermal pixels, and/or the extracted features such as temperatures of livestock.

The processor 106 can use the data received from the data sources 102, the sets of pixels 112 and 114, the extracted features, and the associations, to train one or more machine learning models 120. The machine learning models 120 can include, for example, animal identification models, environmental footprint models, abattoir readiness models, supply and demand models, and/or other types of machine learning models relating to the livestock value chain. The device 104 can run the machine learning models 120 to generate the prediction data 122, and provide the prediction data 122 to the device 130. The device 130 can be used by a user in the livestock value chain such as farmers, breeders, suppliers, sellers, buyers, consumers, veterinarians, and/or other entities among the livestock value chain. The device 130 can run an application 132 using the prediction data 122 to generate output data 134. For example, the prediction data 122 can include a supply and demand forecast for a particular commodity. The device 130 can run the application 132 using the supply and demand forecast to generate the output data 134 indicative of whether a current production speed of the particular commodity is adequate to meet the supply and demand forecast. Further, the users of the device 130 can enter updated information relating to the livestock value chain using the application 132. The device 130 can provide the updated information to the device 104 and the device 104 continuously train the machine learning models 120 using the updated information.

Figure 2:
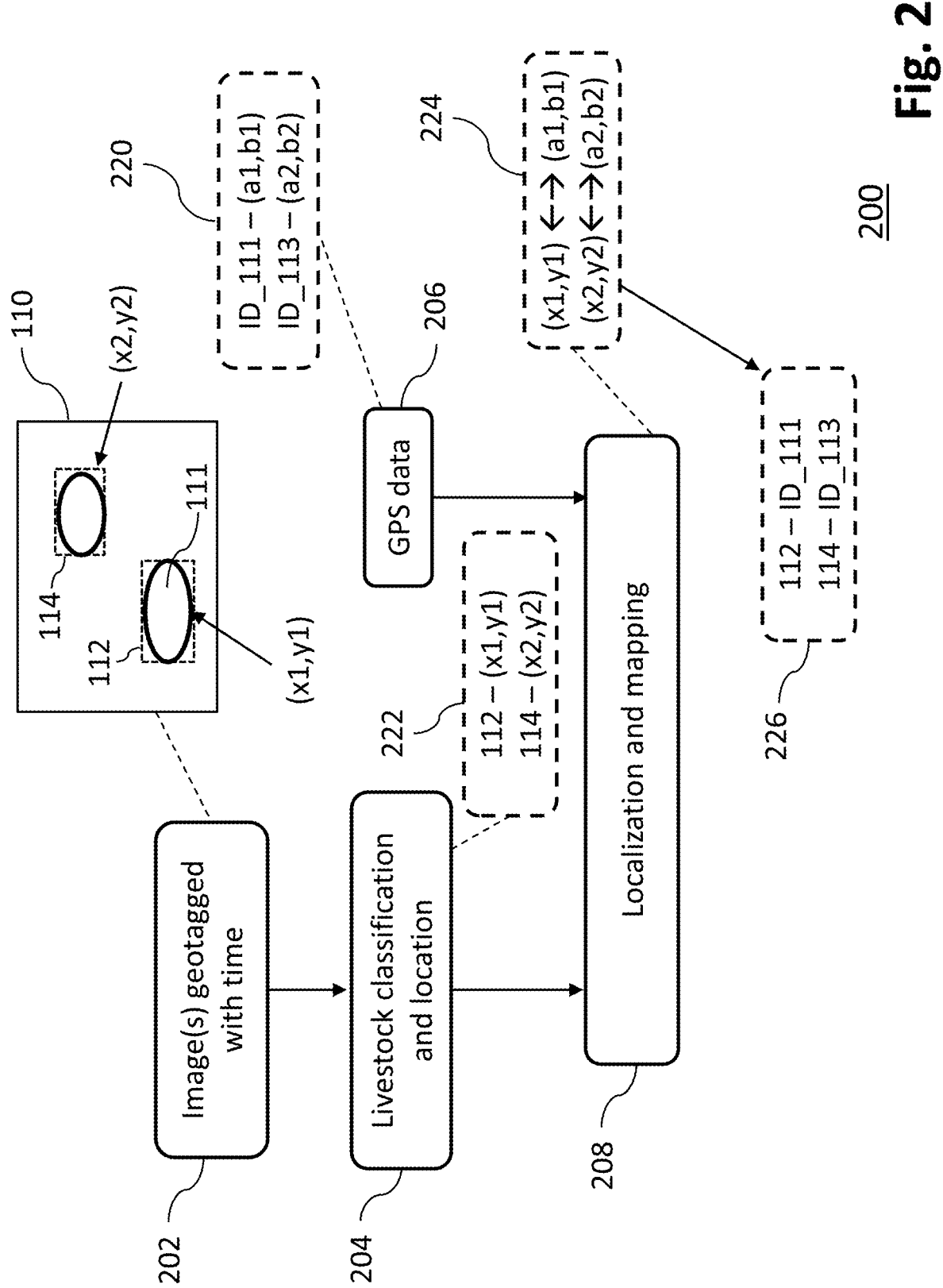
FIG. 2 is a diagram showing a process that can implement machine learning models of livestock value chain in one embodiment.

FIG. 2 is a diagram showing a process 200 that can implement machine learning models of livestock value chain in one embodiment. The process 200 can be implemented by, for example, the processor 106 (FIG. 1), to process data and images received from the data sources 102 (FIG. 1). The process 200 can begin at block 202, where the device 104 can receive one or more images and corresponding geotag data. For example, the image 110 can be received by the device 104 (FIG. 1) and can be geotagged with a time T, indicating that the image 110 was captured by an image sensor (e.g., camera, satellite, etc.) at the time T. Further, the geotag data can indicate a geographical location and dimensions of the image 110. For example, the geotag information can indicate that the image 110 is an image captured from an area bounded by a first longitude, a second longitude, a first latitude, and a second latitude.

The process 200 can proceed from block 202 to block 204. At block 204, the processor 106 (FIG. 1) can classify the livestock shown in the image 110 by running one or more machine learning models on the image 110. For example, the processor 106 (FIG. 1) can run mask region-based convolutional neural networks (R-CNN) and multi-labelled classifiers to determine a likelihood of the types of livestock being shown in different segments (e.g., pixels 112, 114) of the image 110. The processor 106 (FIG. 1) can determine that the set of pixels 112 has a 98.7% likelihood of resembling a particular type of livestock, and the set of pixels 114 has a 100% likelihood of resembling the particular type of livestock. Further, the processor 106 (FIG. 1) can be configured to determine a location of the livestock being shown in the image 110 at the time T. For example, for each livestock shown in the image 110, the processor 106 (FIG. 1) can determine the locations of the sets of pixels 112, 114, with respect to the received longitude and latitude values in the geotag data (e.g., distance difference from the longitude and latitude values). In the example shown in FIG. 2, the processor 106 (FIG. 1) can determine that the set of pixels are located at a location (x1, y1) and the set of pixels 114 are located at a location (x2, y2). The processor 106 (FIG. 1) can store segment data 222 in the memory 108 (FIG. 1), where the segment data 222 can indicate the locations of the segments or sets of pixels 112 and 114.

A block 206 among the process 200 can be performed before or after the blocks 202 and/or 204. At the block 206, the processor 106 (FIG. 1) can receive GPS data 220, captured at the time T, from the data sources 102 (FIG. 1). The GPS data 220 can include an identifier and a location (e.g., GPS coordinates) of a GPS device being equipped or attached to one or more livestock. For example, the GPS data 220 can include an identifier ID_111 and GPS coordinates, or longitude and latitude values, (a1, b1). The GPS data 220 can also include an identifier ID_113 and GPS coordinates, or longitude and latitude values, (a2, b2).

The process 200 can proceed from blocks 204 and 206 to block 208. At block 208, the processor 106 (FIG. 1) can perform a localization and mapping process. The processor 106 (FIG. 1) can compare the segment data 222 with the GPS data 220 to map identifiers among the GPS data 220 to sets of pixels among the segment data 222. In the example shown in FIG. 2, the processor 106 (FIG. 1) can compare the pixel location (x1, y1) with the GPS coordinate (a1, b1), and can compare the pixel location (x2, y2) with the GPS coordinate (a2 b2). In an example, the comparison performed at block 208 can include determining a difference between a pixel location and a GPS coordinate, and comparing the difference with a threshold (e.g., a percentage or a value). For example, the processor 106 (FIG. 1) can determine a percent difference between the pixel location (x1, y1) and the GPS coordinate (a1, b1). If the percent difference between the pixel location (x1, y1) and the GPS coordinate (a1, b1) complies with a threshold (e.g., less than the threshold), such as 3%, then the processor 106 (FIG. 1) can determine that the identifier ID_111 may correspond to the set of pixels 112 or the livestock 111. In the example shown in FIG. 2, based on the comparison, the processor 106 (FIG. 1) can generate map data 226 indicating a mapping between the set of pixels 112 and the identifier ID_111, and between the set of pixels 114 and the identifier ID_113. The mappings among the map data 226 can indicate that the livestock 111, corresponding to the set of pixels 112, can be equipping the GPS device with the identifier ID_111. The mappings among the map data 226 can also indicate that the livestock 113 corresponding to the set of pixels 114 can be equipping the GPS device with the identifier ID_113. In some examples, the processor 106 (FIG. 1) can compare pixel locations among images captured at with GPS coordinates.

Figure 3:
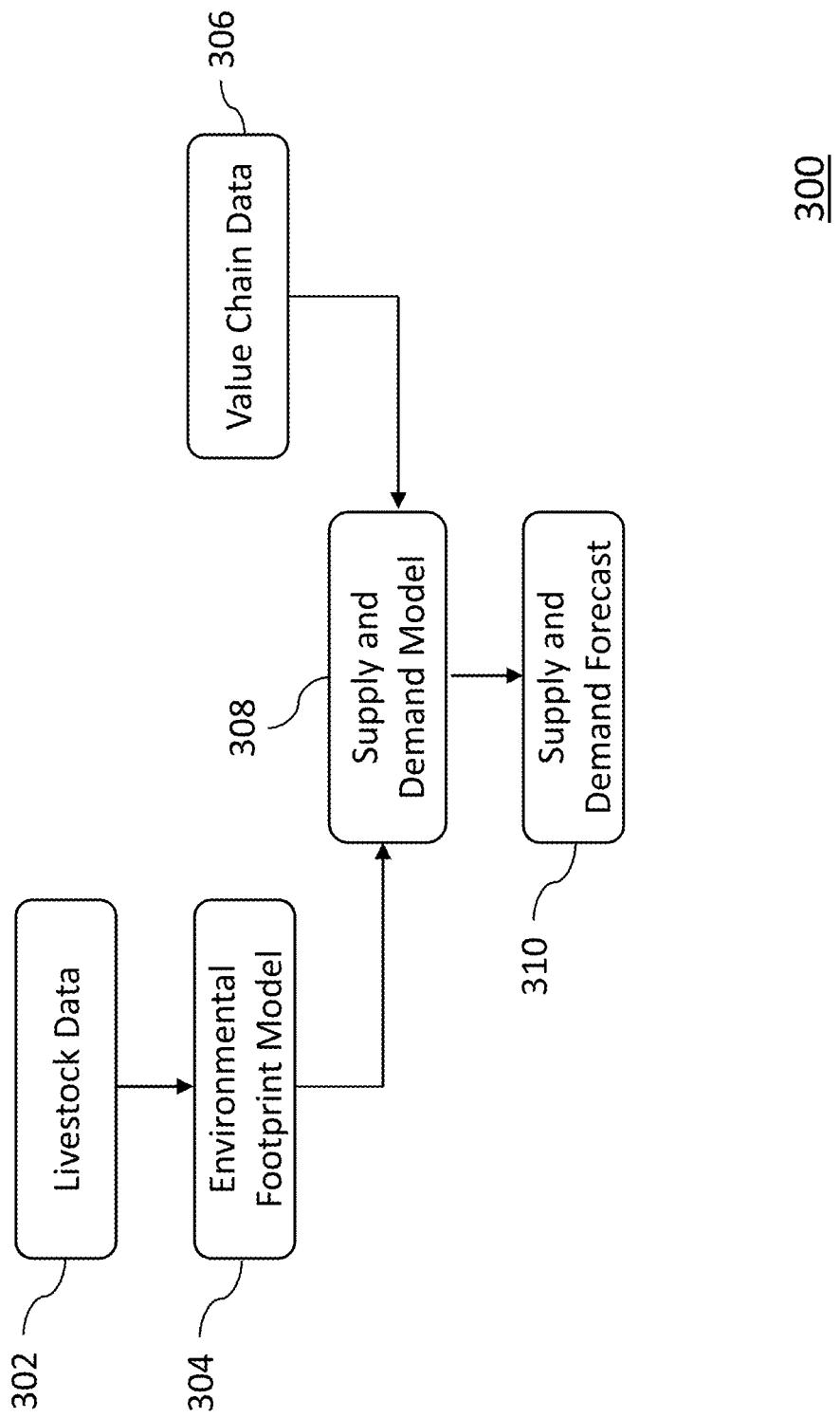
FIG. 3 is a diagram showing another process that can implement machine learning models of livestock value chain in one embodiment.

FIG. 3 is a diagram showing another process 300 that can implement machine learning models of livestock value chain in one embodiment. The process 300 can be implemented by, for example, the processor 106 (FIG. 1), to train a supply and demand model that can be used to generate a supply and demand forecast relating to a livestock value chain. The process 300 can begin at block 302, where the processor 106 (FIG. 1) can receive livestock data from the data sources 102 (FIG. 1). The livestock data can include, for example, physiology of the livestock, number of livestock in a particular location, freshwater consumption, breeding techniques, land-use change, post-farm gate emissions and pre-farm gate emissions, and/or other data that may be associated with the livestock. In an example, at least a portion of the livestock data can be generated by the processor 106 (FIG. 1) based on the identified type of livestock outputted from block 204 (FIG. 2) in the process 200 (FIG. 2). For example, the processor 106 (FIG. 1) can identify the livestock 111 as a particular type of livestock and retrieve information (e.g., from the memory 108 in FIG. 1 or data sources 102 in FIG. 1) pertaining to the particular type of livestock, such as breeding routines and schedule, types of feed, vitamins needed, lifespan, and/or other types of data or information relating to the particular type of livestock. In an example, the memory 108 can be located on the device 104 that includes processor 106 or may be located remotely in a database or blockchain system connected to the device 104 via the network 101.

The process 300 can proceed from block 302 to block 304, where the processor 106 (FIG. 1) can run an environmental footprint model to output environmental footprint data of livestock, or products and commodities associated with the livestock. The environmental footprint data can indicate the effects and impact of the livestock, its livestock type, and its product or commodities on the environment. Another block 306 among the process 300 can be performed before or after the blocks 302 and/or 304. At the block 306, the processor 106 (FIG. 1) can receive value chain data related to a livestock value chain. The value chain data can include, for example, data input from suppliers and consumers, weather prediction, inflation rate, public market research, and/or other types of data relating to activities and process among the livestock value chain.

Further, the processor 106 (FIG. 1) can be configured to train the environmental footprint model being used at block 304. For example, the processor 106 (FIG. 1) can receive measured ecological footprint, biocapacity, carbon footprint, etc. of one or more commodities, to predict an environmental footprint of the commodities using neural network models, such as three-dimensional (3D) convolutional deep neural networks, transformer convolutional neural networks, and/or other neural-symbolic network models. The processor 106 (FIG. 1) can train the neural network models using updates to the livestock data (received at block 302) and value chain data (received at block 306) to learn an environmental footprint model. The processor 106 (FIG. 1) can further deploy the trained neural network models in inference mode, and in the livestock value chain pipeline to provide real-time predictions of an environmental footprint associated with the livestock and commodities.

The process 300 can continue from blocks 304 and 306 to block 308. At block 308, the processor 106 (FIG. 1) can use the value chain data received from block 306 and the environmental footprint data outputted from the environmental footprint model in block 304 to train a supply and demand model (e.g., among the models 120 shown in FIG. 1). In an example, the supply and demand model can be a trained neural attention transformer network or temporal graph neural attention network, such as a tensor graph convolutional network (GCN) or evolveGCN. The supply and demand model can be run (e.g., by the processor 106) to project supply and demand of one or more products of commodities related to a livestock over time.

The process 300 can continue from blocks 308 to block 310. At block 310, the processor 106 (FIG. 1) can run the supply and demand model on particular inputs such as a particular livestock, a particular number of livestock, a particular time, particular geographical areas, and/or other types of input. For example, the processor 106 (FIG. 1) can run the supply and demand model to forecast or project a supply and demand of a commodity associated with livestock 111 (FIG. 1) and 113 (FIG. 1) shown in image 110 (FIG. 1) in one or more geographical areas over a period of time. The supply and demand forecast resulting from running the supply and demand model can provide, for example, expected demand, expected supply from competitors, price of livestock food, and/or other information pertaining to supply and demand of a livestock and its products or commodities. The processor 106 (FIG. 1) can send the supply and demand forecast to the device 130 (FIG. 1). The device 130 (FIG. 1) can run the application 132 (FIG. 1) to analyze the supply and demand forecast, and output recommendation data to users of the device 130 (FIG. 1) to recommend optimal purchasing, selling, and distribution activities in response to certain timeframe and/or events. For example, the supply and demand forecast can indicate an increase or decrease of demand for a certain commodity in particular seasons, months, or in response to events such as a weather event, epidemic.

Figure 4:
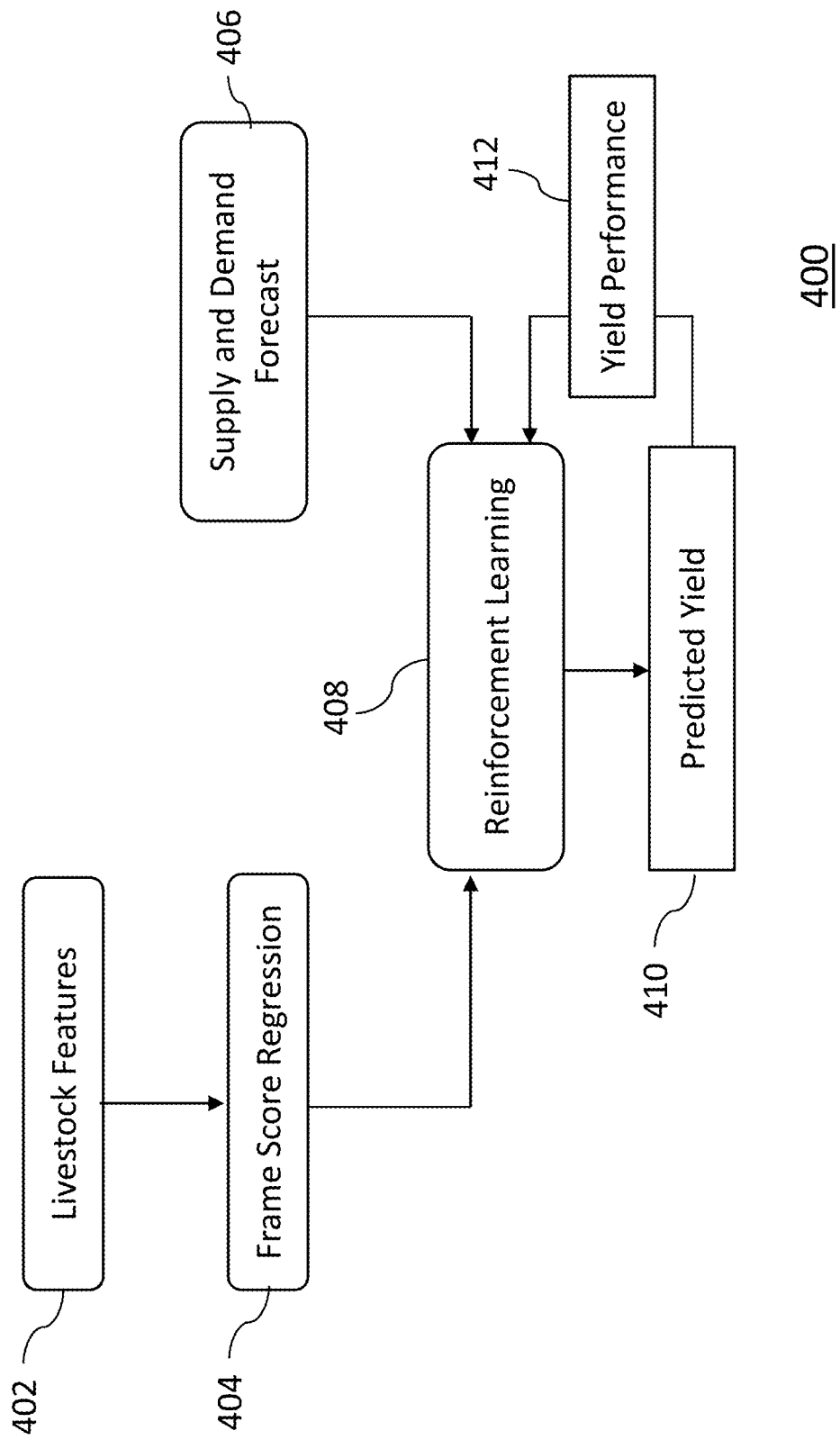
FIG. 4 is a diagram showing another process that can implement machine learning models of livestock value chain in one embodiment.

FIG. 4 is a diagram showing another process 400 that can implement machine learning models of livestock value chain in one embodiment. The process 400 can be implemented by the processor 106 (FIG. 1) to output a predicted yield, where the predicted yield can indicate a livestock's yield over a timeframe, given a set of feeding activities that can be made to the livestock. The livestock's yield over a timeframe can be analyzed, either by a computing device (e.g., device 130 in FIG. 1) or by a user, to identify an optimal time to send the livestock to an abattoir for optimal yield. The process 400 can begin at block 402, there the processor 106 (FIG. 1) can extract livestock features from the segments of set of pixels 112, 114 (FIG. 1), assigned as digital representation of livestock, stored in the memory 108 (FIG. 1). The processor 106 (FIG. 1) can perform various image processing techniques on the sets of pixels 112, 114 (FIG. 1), to extract features of the livestock 111, 113 (FIG. 1), respectively. The extracted features can include, for example, hip height, age, size, and/or other features of the corresponding livestock.

The process 400 can continue from block 402 to block 404. At block 404, the processor 106 (FIG. 1) can perform frame score regression techniques on the features extracted from block 402. The frame score regression can output, for example, mature size, body composition, estimate performance potential, feed requirements, and/or other information of the livestock based on the digital representations of the livestock over a plurality of images (e.g., image 110 in FIG. 1) captured from different times. Another block 406 can be performed by the processor 106 (FIG. 1) before or after performing blocks 402 and/or 404. At block 406, the processor 106 (FIG. 1) can obtain the supply and demand forecast outputted from, for example, block 310 (FIG. 3) of the process 300 (FIG. 3).

The process 400 can continue from blocks 404 and 406 to block 408. At block 408, the processor 106 (FIG. 1) can train a readiness model (e.g., among the models 120 in FIG. 1), which can be a neural network model, using reinforcement learning techniques with the frame score regression outputs and the supply and demand forecast. The readiness model being trained by the processor 106 (FIG. 1) using reinforcement learning can output a predicted yield 410 indicating a livestock's yield over a timeframe. Further, the processor 106 (FIG. 1) can receive yield performance 412 from entities among the livestock value chain, such as suppliers and consumers. The yield performance 412 can indicate a yield of the livestock in response to particular scenarios, such as being fed under a certain feeding plan and being sent to the abattoir under a particular time, output quantity of the abattoir with respect to grade quality, and the contribution to the livestock value chain demand prices. The processor 106 (FIG. 1) can retrain the readiness model using the yield performance to adjust the predicted yield 410. The processor 106 (FIG. 1) can send the predicted yield 410 to the device 130 (FIG. 1). The device 130 (FIG. 1) can run the application 132 (FIG. 1) to identify, for example, optimal feeding plan for the livestock (e.g. protein, minerals, vitamins, etc.) and optimal time to send the livestock to the abattoir. In some examples, the processor 106 (FIG. 1) can use a boosting technique to perform the reinforcement learning on time-series inputs (e.g., yield performance over time). For example, the processor 106 (FIG. 1) can use an optimization library for gradient-boosting, decision trees, random forest, etc., to increase a speed of performing tasks such as regression and classification during the reinforcement learning.

Figure 5:
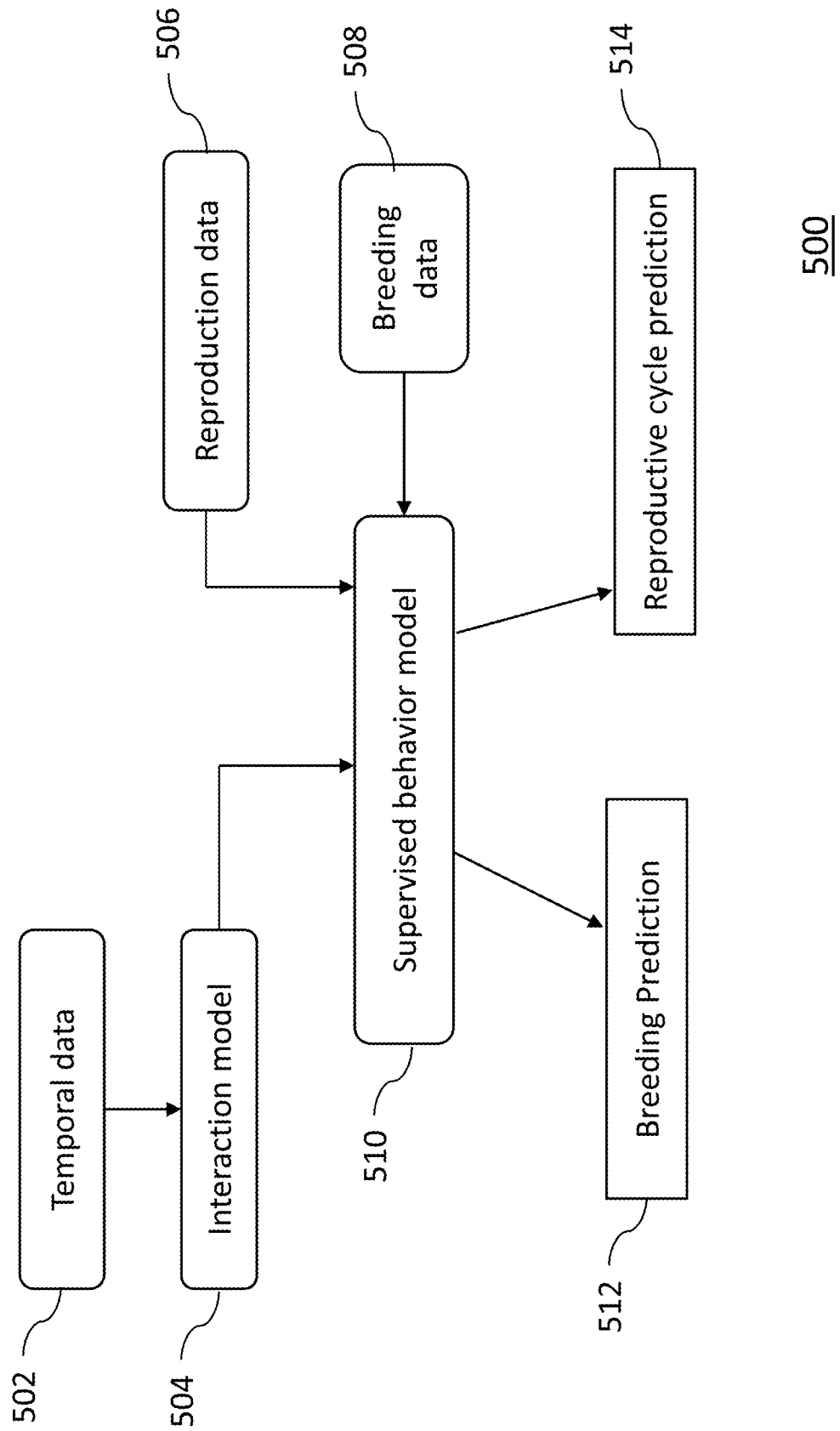
FIG. 5 is a diagram showing another process that can implement machine learning models of livestock value chain in one embodiment.

FIG. 5 is a diagram showing another process 500 that can implement machine learning models of livestock value chain in one embodiment. The process 500 can be implemented by the processor 106 (FIG. 1) to train a livestock behavior model, where this livestock behavior model can be used to generate prediction data relating to breeding of the livestock. The process 500 can begin at block 502, where the device 104 (FIG. 1) can receive temporal data from the data sources 102 (FIG. 1). The temporal data can indicate, for example, temporal geospatial data indicating locations of digital representations (e.g., sets of pixels 112, 114 in FIG. 1) at one or more times.

The process 500 can proceed from block 502 to block 504, where the processor 106 (FIG. 1) can train an interaction model using the temporal data obtained in block 502. The temporal data received at block 502 and the mapping 226 (FIG. 2) can be used by the processor 106 (FIG. 1) to train the interaction model. For example, temporal data can include a series of satellite images showing movements of the set of pixels 112 (FIG. 1) and the set of pixels 114 (FIG. 1) across a series of times. The set of pixels 112 (FIG. 1) and the set of pixels 114 (FIG. 1) can be substantially identical (e.g., indicating livestock 111, 113 (FIG. 1) may have substantially similar shade or fur pattern). The processor 106 (FIG. 1) can rely on the mappings 226 (FIG. 2) and temporal GPS data to distinguish movement between the set of pixels 112 (FIG. 1) and the set of pixels 114 (FIG. 1). For example, GPS data can show that the livestock 111 (FIG. 1) is moving towards a first location and the livestock 113 (FIG. 1) is moving towards a second location within the same timeframe. The processor 106 (FIG. 1) can compare the GPS data with the time series images to determine that the set of pixels 112 (FIG. 1), mapped to ID_111 (FIG. 2), is moving towards the first location. The interaction model can be a model indicating interaction between different livestock. For example, the interaction model can indicate whether a first livestock moves toward a second livestock frequently, and durations in which the first livestock remain in proximity to the second livestock, and any anomalies in movement of the livestock.

The process 500 can also include another block 506 that can be performed before or after the blocks 502 and 504. At block 506, the device 104 (FIG. 1) can receive reproduction data from the data sources 102 (FIG. 1). The reproduction data can include, for example, in-heat periods, pregnancy periods, calf feeding, virility measures of identified livestock, and/or other data relating to reproduction of a corresponding livestock. Further, the process 500 can also include another block 508 that can be performed before or after the blocks 502, 504, and 506. At block 508, the device 104 (FIG. 1) can receive breeding data from the data sources 102 (FIG. 1) or from a breeder. The breeding data can include, for example, breeding history, breeding performance, and/or other information relating to breeding of a livestock.

The process 500 can proceed to block 510, where the processor 106 (FIG. 1) can train a behavior model (e.g., among the models 120 in FIG. 1) using output from the interaction model, the reproduction data, and the breeding data. The processor 106 (FIG. 1) can train the behavior model using supervised machine learning techniques. The processor 106 (FIG. 1) can run the behavior model to generate prediction data 122 (FIG. 1), such as breeding prediction data and reproduction cycle prediction data. The breeding prediction data can include, for example, estimation and comparison results of virility of the livestock. The reproductive cycle prediction data can include, for example, estimation of in-heat, inseminated, birthing status, and feeding of livestock. The processor 106 (FIG. 1) can send the breeding prediction data and the reproductive cycle prediction data to the device 130 (FIG. 1). The device 130 (FIG. 1) can run the application 132 (FIG. 1) to identify, for example, optimal times to send livestock to a breeder.

Figure 6:
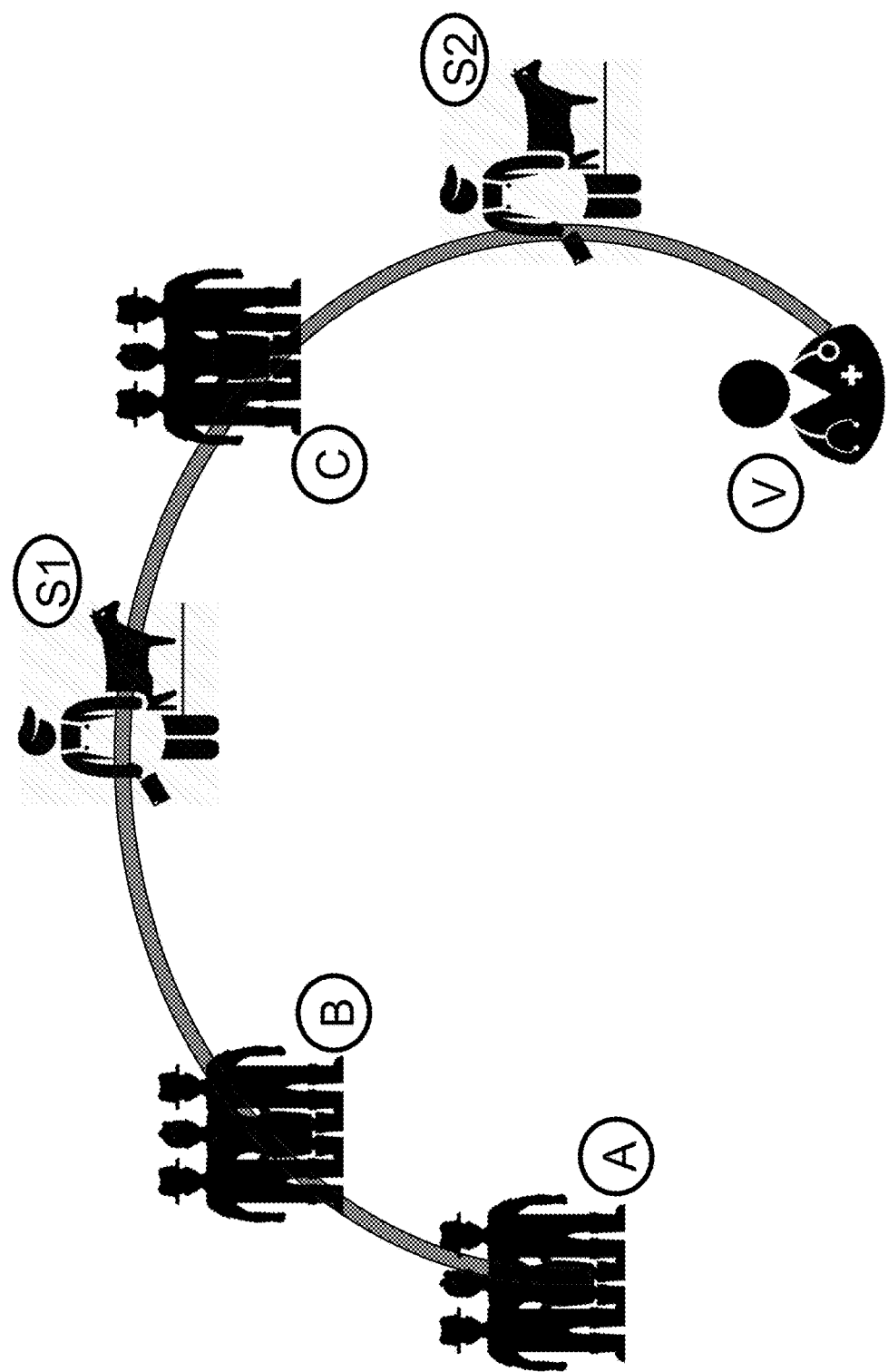
FIG. 6 is a diagram showing an example implementation of machine learning models of livestock value chain in one embodiment.

FIG. 6 is a diagram showing an example implementation of machine learning models of livestock value chain in one embodiment. In an example shown in FIG. 6, the system 100 (FIG. 1) can be implemented to make predictions on various aspects of a livestock value chain during an event such as an epidemic. For example, at a farm A, a first farmer can use the application 132 (FIG. 1) to share the sickness and symptom information with other entities of the livestock value chain. At a farm B, a second farmer can use the application 132 (FIG. 1) to share information indicating livestock at farm B share resources (e.g., water) with livestock at farm A, but does not show signs of sickness. At breeding location S1, an abattoir can use the application 132 (FIG. 1) to share issues identified in livestock originated from farm B. At farm C, a third farmer can use the application 132 (FIG. 1) to share sickness information of livestock on farm C but does not share resources with livestock from farms A and B. At abattoir S2, another abattoir can use the application 132 (FIG. 1) to indicate that strict hygiene is being practiced by personnel at abattoir S2. Further, a veterinarian V can use the application 132 (FIG. 1) to communicate that livestock from farms A and C are being treated by the veterinarian V.

Figure 7:
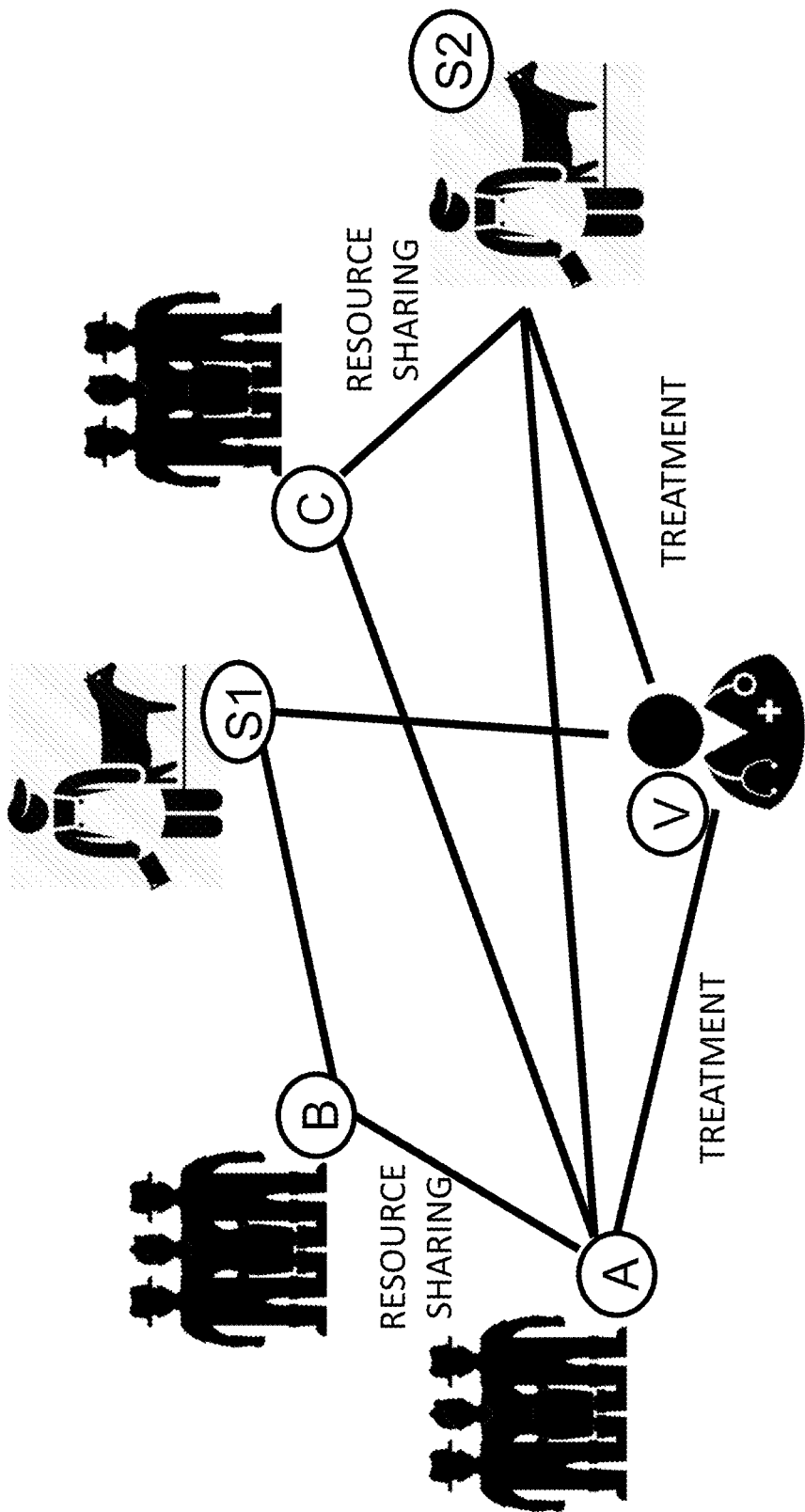
FIG. 7 is a diagram showing another example implementation of machine learning models of livestock value chain in one embodiment.

FIG. 7 is a diagram showing another example implementation of machine learning models of livestock value chain in one embodiment. In FIG. 7, the processor 106 (FIG. 1) of system 100 (FIG. 1) can generate a livestock value chain graph network based on information provided by various entities shown in FIG. 6. For example, the processor 106 (FIG. 1) can build a link between the farm C and the abattoir S2 based on the information indicating that livestock from the farm C and the abattoir S2 share resources (as indicated by the third farmer at farm C). The network generated by the processor 106 (FIG. 1) can be used to identify relationship between different entities among the livestock value chain. The identified relationships can be used by the processor 106 (FIG. 1) to train the models 120 (FIG. 1), where the trained models 120 (FIG. 1) can output updated prediction data 122 (FIG. 1). The processor 106 (FIG. 1) can provide the updated prediction data 122 (FIG. 1) to the device 130 (FIG. 1) such that the entities among the livestock value chain can use the updated prediction data to make optimal decisions. For example, the relationship between the farm C and the abattoir S2, shown in FIG. 7, can be used as an input to train a supply and demand model in order to adjust a probable decrease in supplies from the farm C and the abattoir S2 within a future time frame.

Figure 8:
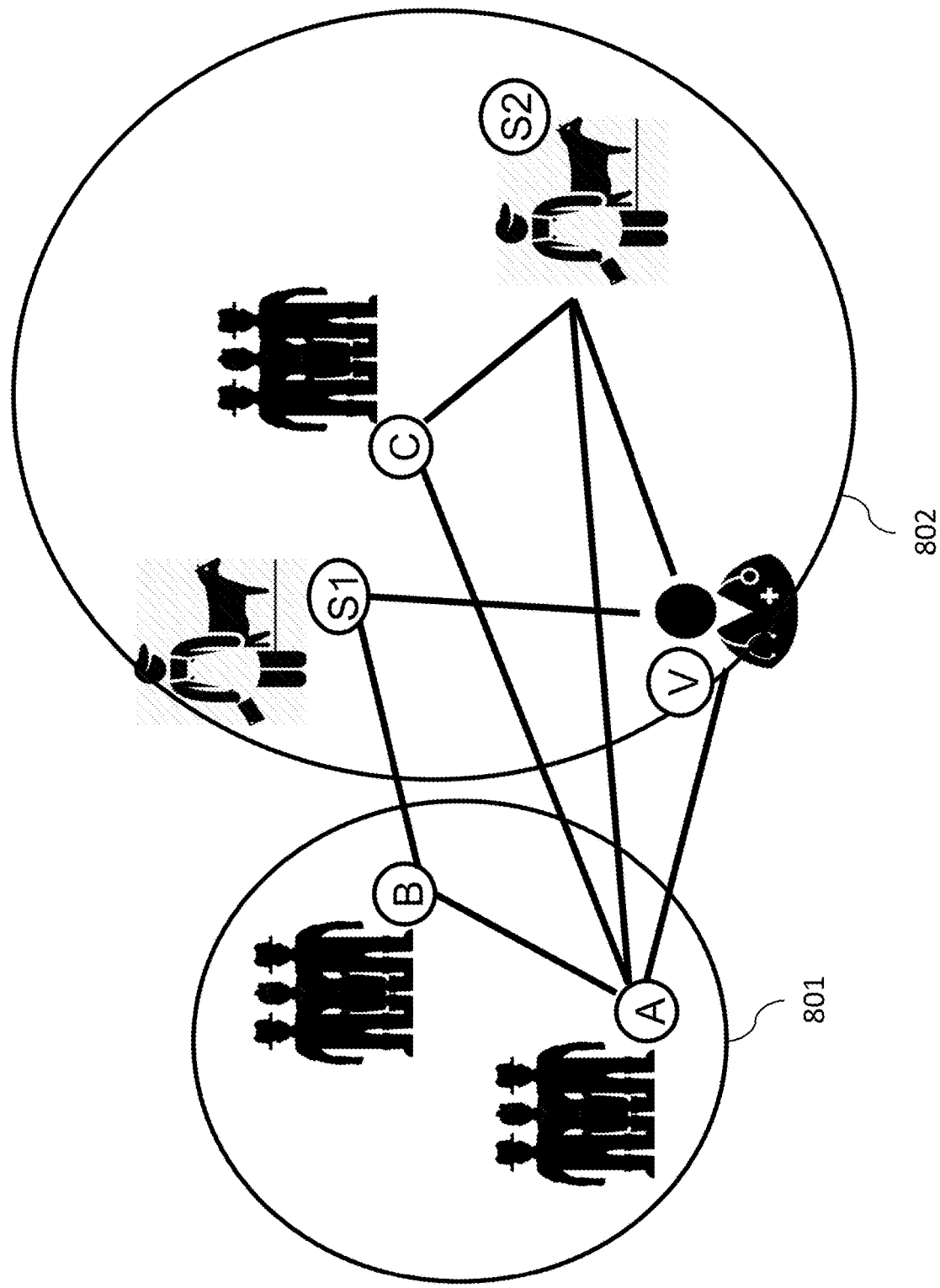
FIG. 8 is a diagram showing another example implementation of machine learning models of livestock value chain in one embodiment.

FIG. 8 is a diagram showing another example implementation of machine learning models of livestock value chain in one embodiment. In an example shown in FIG. 8, the processor 106 (FIG. 1) can identify one or more clusters to group different entities based on the generated network shown in FIG. 7. For example, a first cluster 801 can be formed based on the links between the farms A, B, the abattoir S1, and the veterinarian V forming a closed loop. A second cluster 802 can be formed based on the links between the farms A, C, the abattoir S2, and the veterinarian V forming another closed loop. The clusters can be used to identify relationship between different entities among the livestock value chain. The cluster-based relationships can be used by the processor 106 (FIG. 1) to train the models 120 (FIG. 1), where the trained models 120 (FIG. 1) can output updated prediction data 122 (FIG. 1). The processor 106 can provide the updated prediction data 122 (FIG. 1) to the device 130 (FIG. 1) such that the entities among the livestock value chain can use the updated prediction data to make optimal decisions. For example, the cluster 801 can be used as an input to train a supply and demand model in order to adjust a probable decrease in supplies from the farm B and the abattoir S1 in response to an event where livestock on farm A is confirmed to be experiencing an epidemic.

The implementation of the system 100 (FIG. 1), as described herein, can provide a consumer dashboard (e.g., application 132 in FIG. 1) to include snapshot of the lifespan of the livestock, which can be accessible by scanning the packaging or microbiome fingerprint of the animal. Further, the system 100 (FIG. 1) can aggregate comparative metrics on the livestock's different life stages to provide, via the application 132 (FIG. 1), enhanced traceability, recommended feeding habits, abattoir fattening practices, movement patterns of livestock (e.g., concrete free-range comparator), environmental impact of livestock, and potential threat indicators (e.g., epidemic).

Figure 9:
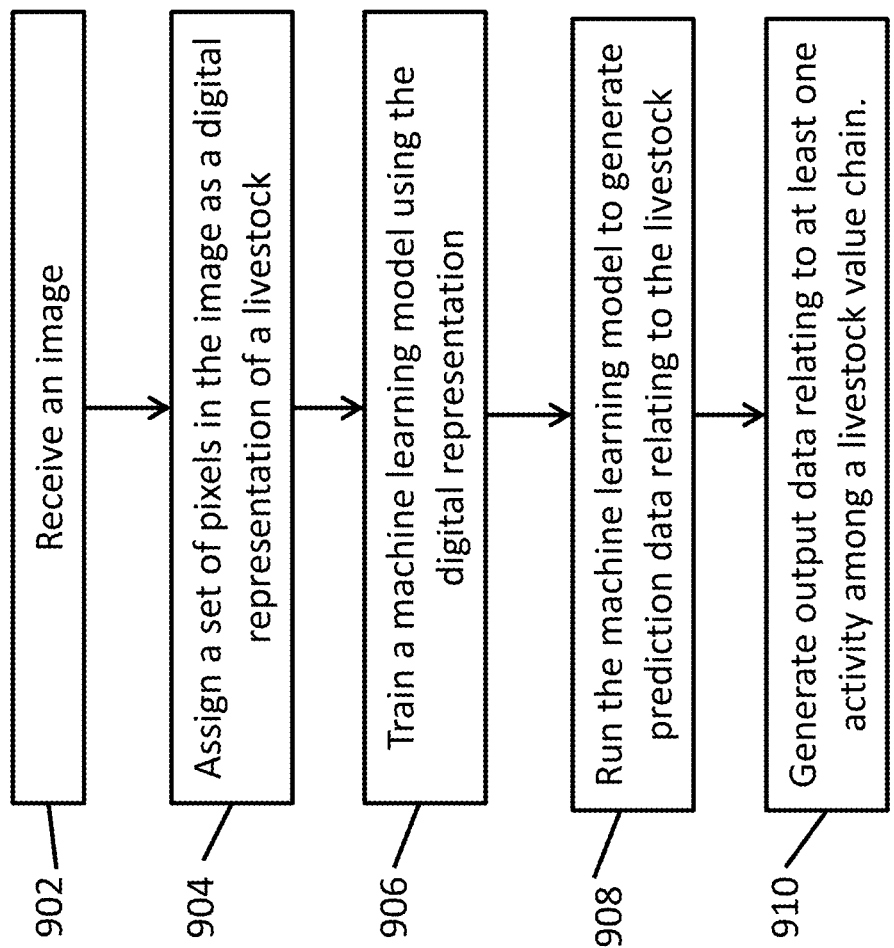
FIG. 9 is another flow diagram illustrating a method of implementing a process relating to machine learning models of livestock value chain in one embodiment.

FIG. 9 is a flow diagram illustrating a method of implementing a process 900 relating to machine learning models of livestock value chain in one embodiment. An example process may include one or more operations, actions, or functions as illustrated by one or more of blocks 902, 904,

906, 908, and/or 910. Although illustrated as discrete blocks, various blocks can be divided into additional blocks, combined into fewer blocks, eliminated, or performed in parallel, depending on the desired implementation.

The process 900 can begin at block 902. At block 902, a device can receive an image. In an example, the image can be a satellite image. In another example, the image can be an infrared image having thermal pixels. The process 900 can continue from block 902 to block 904. At block 904, the device can assign a set of pixels in the image as a digital representation of a livestock. In an example, the device can receive geotag data indicating a geographical region shown by the received image. The device can further determine a location of the set of pixels with respect to the geographical region. The device can further receive global positioning system (GPS) data including an identifier and GPS coordinates. The device can further compare the determined location with the GPS coordinates. Based on a result of the comparison, the device can map the set of pixels to the identifier to assign the set of pixels as the digital representation of the livestock.

The process 900 can continue from block 904 to block 906. At block 906, the device can train a machine learning model using the digital representation. The process 900 can continue from block 906 to block 908. At block 908, the device can run the machine learning model to generate prediction data relating to the livestock. The process 900 can continue from block 908 to block 910. At block 910, the device can generate output data relating to at least one activity corresponding to a process among a livestock value chain to generate a commodity based on the livestock.

In an example, the machine learning model can be an abattoir readiness model and the prediction data can be a predicted yield of the livestock over a timeframe. The device can extract features of the livestock from the digital representation and train the abattoir readiness model using the extracted features. The device can further run the abattoir readiness model to generate the predicted yield of the livestock over the timeframe.

In another example, the machine learning model can be an environmental footprint model and the prediction data can be an environmental footprint forecast. The device can run a classifier on the set of pixels to identify a livestock type of the livestock. The device can further receive data relating to the livestock type from a plurality of data sources and train the environmental footprint model using the received data and the digital representation of the livestock. The device can further run the environmental footprint model to generate the environmental footprint forecast.

In another example, the machine learning model can be a behavior model and the prediction data can be breeding prediction data. The device can receive additional images captured in a series of times, said additional images including the set of pixels. The device can determine a plurality of locations of the set of pixels with respect to the geographical region. The device can receive a plurality of global positioning system (GPS) data generated at the series of times. The GPS data can include an identifier and a plurality of GPS coordinates at the series of times. The device can comparing the plurality of locations with the plurality of GPS coordinates. The device can, based on a result of the comparison, track a movement of the livestock over the series of times. The device can determine interaction between the livestock and other livestock based on the tracked movement and train the behavior model using the tracked movement. The behavior model can project behaviors and interactions between different livestock. The device can run the behavior model to generate the breeding prediction data relating to the livestock.

In another example, the machine learning model can be a supply and demand model and the prediction data is a supply and demand forecast of the livestock. The device can run an environmental footprint model to output environmental footprint data of the livestock. The device can receive value chain data related to a livestock value chain and train the supply and demand model using the environmental footprint data of the livestock. The device can run the supply and demand model to generate the supply and demand forecast.

Figure 10:
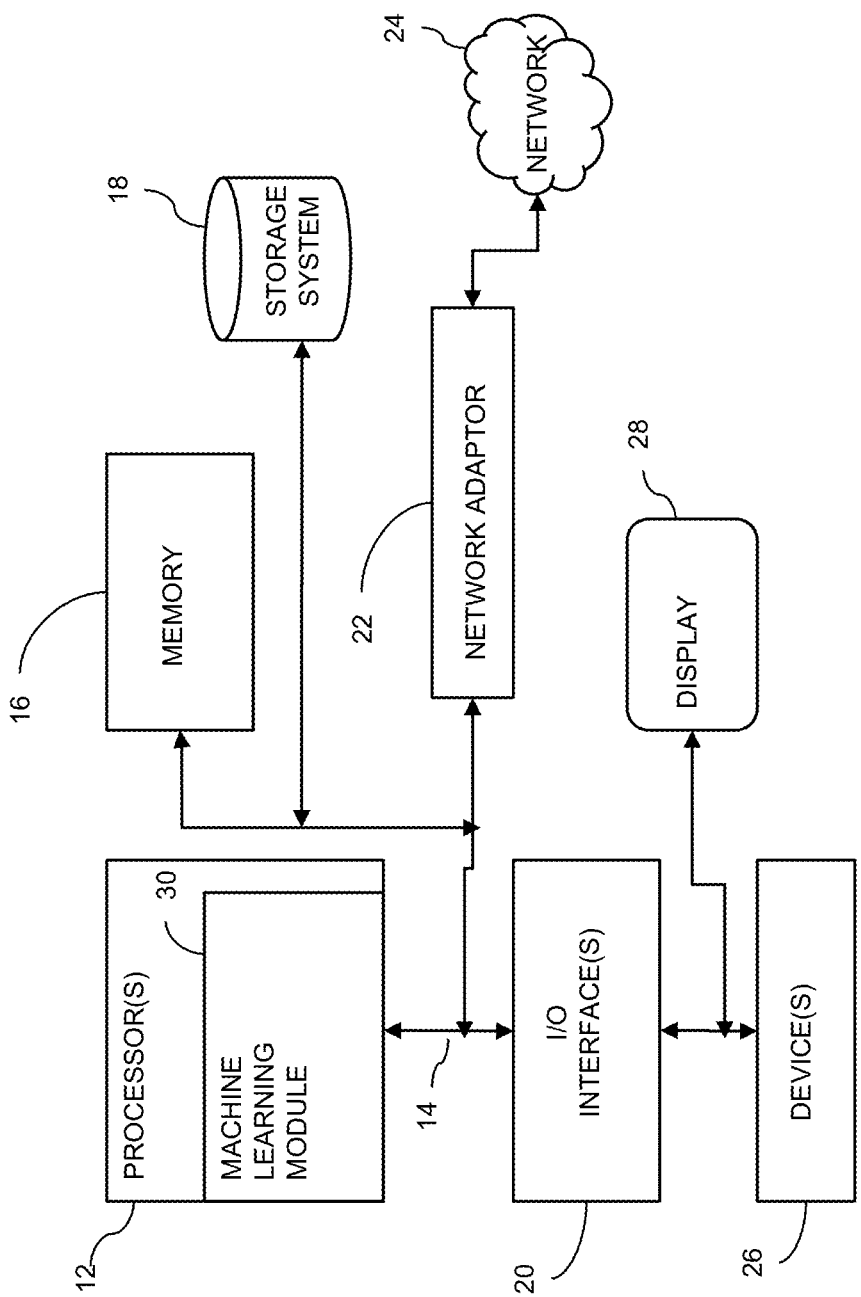
FIG. 10 illustrates a schematic of an example computer or processing system relating to machine learning models of livestock value chain in one embodiment.

FIG. 10 illustrates a schematic of an example computer or processing system that may implement machine learning models of livestock value chain in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., machine learning module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 11:
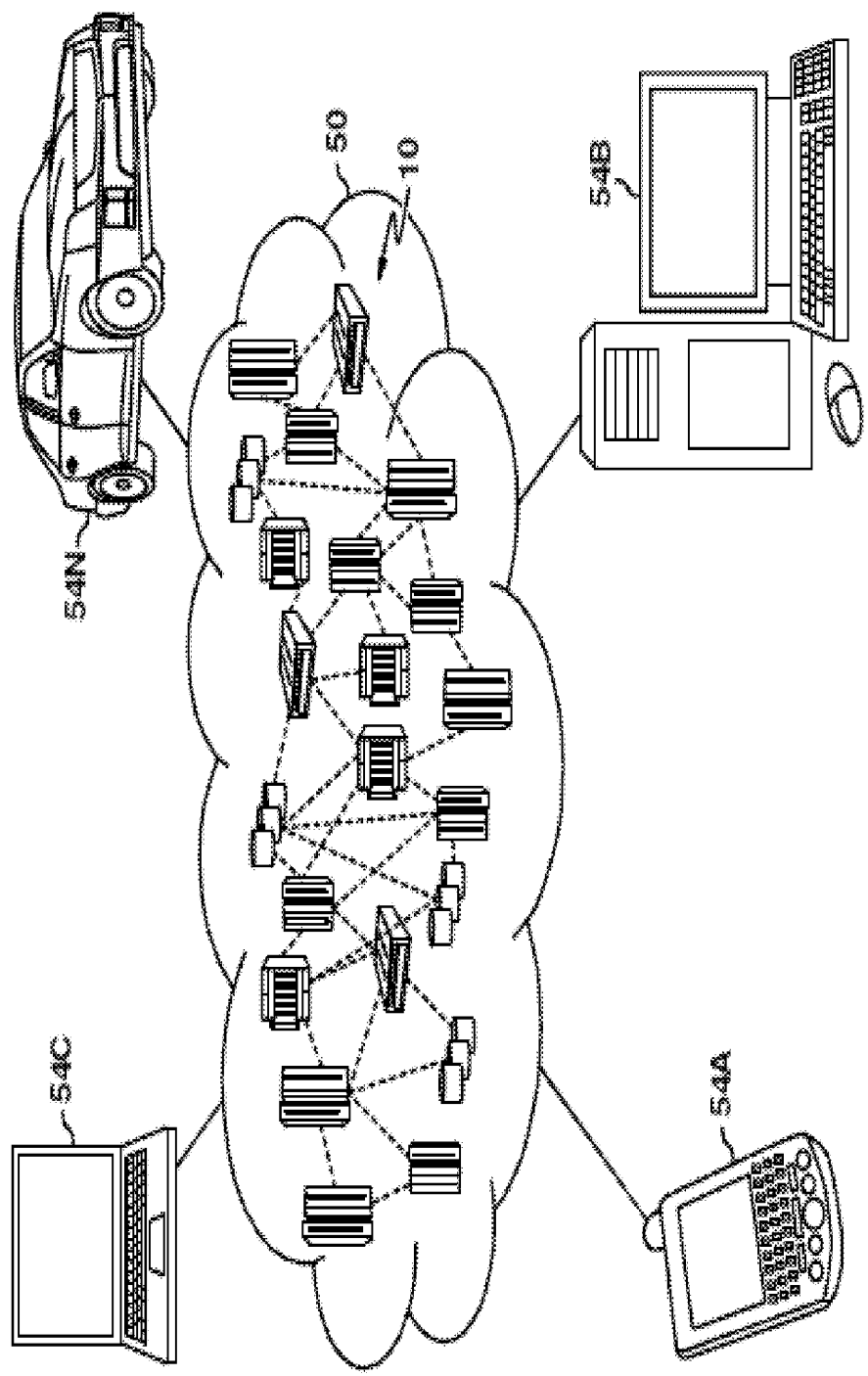
FIG. 11 depicts a cloud computing environment according to an embodiment of the present invention.

FIG. 11 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
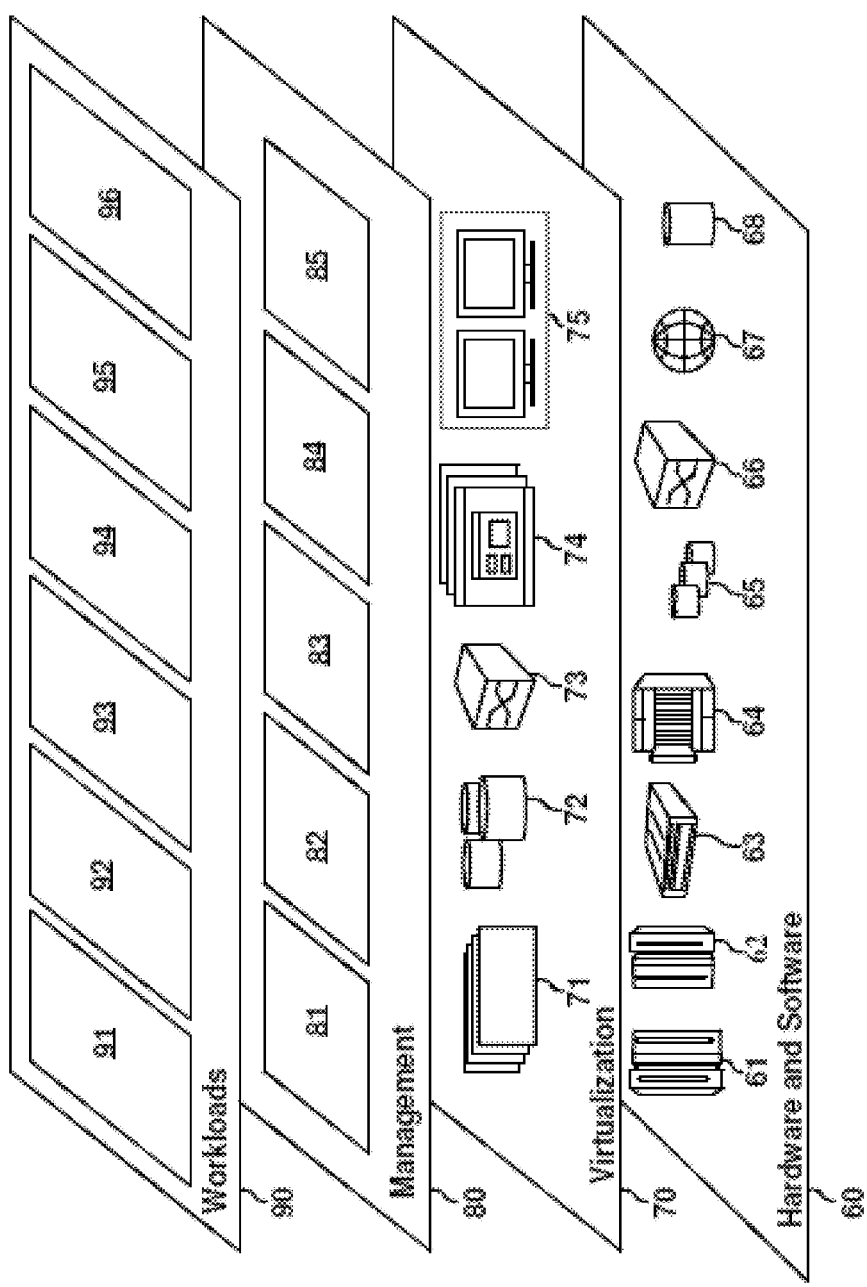
FIG. 12 depicts abstraction model layers according to an embodiment of the present invention.

FIG. 12 depicts abstraction model layers according to an embodiment of the present invention. Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and livestock value chain application 96.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for operating a machine learning system, the method comprising:
   receiving, by a processor, an image of a plurality of livestock;
   receiving, by the processor, geotag data indicating a geographical region shown by the received image;
   receiving, by the processor, global positioning system (GPS) data including an identifier and GPS coordinates associated with the image;
   running, by the processor, a classifier on the received image and GPS data to determine a type of livestock being represented by the received image;
   determining, by the processor, a location of a set of pixels in the image with respect to the geographical region;
   based on a comparison between the determined location and the GPS coordinates, assigning, by the processor, the set of pixels in the image as a digital representation of a livestock;
   training, by the processor, a machine learning model using the digital representation and the determined type of livestock;
   running, by the processor, the machine learning model to generate prediction data relating to the livestock; and
   based on the prediction data, generating, by the processor, output data relating to at least one activity among a livestock value chain of the livestock, wherein the livestock value chain is a chain of activities to produce and deliver commodities based on the livestock.

2. The computer-implemented method of claim 1, wherein the machine learning model is an abattoir readiness model, the prediction data is a predicted yield of the livestock over a timeframe, and the method further comprises:
   extracting, by the processor, features of the livestock from the digital representation;

training, by the processor, the abattoir readiness model using the extracted features;
running, by the processor, the abattoir readiness model to generate the predicted yield of the livestock over the timeframe.

3. The computer-implemented method of claim 1, wherein the machine learning model is an environmental footprint model, the prediction data is an environmental footprint forecast, and the method further comprises:
receiving, by the processor, data relating to the type of livestock from a plurality of data sources;
training, by the processor, the environmental footprint model using the received data and the digital representation of the livestock; and
running, by the processor, the environmental footprint model to generate the environmental footprint forecast.

4. The computer-implemented method of claim 1, further comprising:
comparing, by the processor, the determined location with the GPS coordinates;
based on a result of the comparison, mapping, by the processor, the set of pixels to the identifier to assign the set of pixels as the digital representation of the livestock; and
generating, by the processor, livestock data based on the determined type of livestock being represented by the received image.

5. The computer-implemented method of claim 1, wherein the image is a satellite image.

6. The computer-implemented method of claim 1, further comprising:
receiving, by the processor, additional images captured in a series of times, said additional images including the set of pixels;
determining, by the processor, a plurality of locations of the set of pixels with respect to the geographical region;
receiving, by the processor, a plurality of global positioning system (GPS) data generated at the series of times, the GPS data including an identifier and a plurality of GPS coordinates at the series of times;
comparing, by the processor, the plurality of locations with the plurality of GPS coordinates; and
based on a result of the comparison, tracking, by the processor, a movement of the livestock over the series of times, wherein training the machine learning model comprises training the machine learning model using the tracked movement.

7. The computer-implemented method of claim 6, wherein the machine learning model is a behavior model, and the prediction data is breeding prediction data, and the method further comprises:
determining, by the processor, interaction between the livestock and other livestock based on the tracked movement;
training, by the processor, the behavior model using the tracked movement, wherein the behavior model projects behaviors and interactions between different livestock; and
running, by the processor, the behavior model to generate the breeding prediction data relating to the livestock.

8. The computer-implemented method of claim 1, wherein the machine learning model is a supply and demand model, the prediction data is a supply and demand forecast of the livestock, and the method further comprises:
running, by the processor, an environmental footprint model to output environmental footprint data of the livestock;
receiving, by the processor, value chain data related to a livestock value chain;
training, by the processor, the supply and demand model using the environmental footprint data of the livestock; and
running, by the processor, the supply and demand model to generate the supply and demand forecast.

9. A system comprising:
a memory;
a processor configured to be in communication with the memory, the processor being configured to:
receive an image of a plurality of livestock;
receive geotag data indicating a geographical region shown by the received image;
receive global positioning system (GPS) data including an identifier and GPS coordinates associated with the image;
run a classifier on the received image and GPS data to determine a type of livestock being represented by the received image;
determine a location of a set of pixels in the image with respect to the geographical region;
based on a comparison between the determined location and the GPS coordinates, assign the set of pixels in the image as a digital representation of a livestock;
train a machine learning model using the digital representation and the determined type of livestock;
run the machine learning model to generate prediction data relating to the livestock; and
based on the prediction data, generate output data relating to at least one activity among a livestock value chain of the livestock, wherein the livestock value chain is a chain of activities to produce and deliver commodities based on the livestock.

10. The system of claim 9, wherein the machine learning model is an abattoir readiness model, the prediction data is a predicted yield of the livestock over a timeframe, and the processor is further configured to:
extract features of the livestock from the digital representation;
train the abattoir readiness model using the extracted features; and
run the abattoir readiness model to generate the predicted yield of the livestock over the timeframe.

11. The system of claim 9, wherein the machine learning model is an environmental footprint model, the prediction data is an environmental footprint forecast, and the processor is further configured to:
receive data relating to the type of livestock from a plurality of data sources;
train the environmental footprint model using the received data and the digital representation of the livestock; and
run the environmental footprint model to generate the environmental footprint forecast.

12. The system of claim 9, wherein the processor is further configured to:
compare the determined location with the GPS coordinates;
based on a result of the comparison, map the set of pixels to the identifier to assign the set of pixels as the digital representation of the livestock; and
generating livestock data based on the determined type of livestock being represented by the received image.

13. The system of claim 9, wherein the machine learning model is a behavior model, and the prediction data is breeding prediction data, and the processor is further configured to:

receive additional images captured in a series of times, said additional images including the set of pixels;
determine a plurality of locations of the set of pixels with respect to the geographical region;
receive a plurality of global positioning system (GPS) data generated at the series of times, the GPS data including an identifier and a plurality of GPS coordinates at the series of times;
compare the plurality of locations with the plurality of GPS coordinates;
based on a result of the comparison, track a movement of the livestock over the series of times;
determine interaction between the livestock and other livestock based on the tracked movement;
train the behavior model using the tracked movement, wherein the behavior model projects behaviors and interactions between different livestock; and
run the behavior model to generate the breeding prediction data relating to the livestock.

14. The system of claim 9, wherein the machine learning model is a supply and demand model, the prediction data is a supply and demand forecast of the livestock, and the processor is further configured to:
run an environmental footprint model to output environmental footprint data of the livestock;
receive value chain data related to the livestock value chain;
train the supply and demand model relating to the livestock using the environmental footprint data of the livestock; and
run the supply and demand model to generate the supply and demand forecast.

15. A computer program product for operating a machine learning system, the computer program product comprising a computer readable storage medium having program instructions embodied therewith, the program instructions executable by a processor of a device to cause the device to:
receive an image of a plurality of livestock;
receive geotag data indicating a geographical region shown by the received image;
receive global positioning system (GPS) data including an identifier and GPS coordinates associated with the image;
run a classifier on the received image and GPS data to determine a type of livestock being represented by the received image;
determine a location of a set of pixels in the image with respect to the geographical region;
based on a comparison between the determined location and the GPS coordinates, assign the set of pixels in the image as a digital representation of a livestock;
train a machine learning model using the digital representation and the determined type of livestock;
run the machine learning model to generate prediction data relating to the livestock; and
based on the prediction data, generate output data relating to at least one activity among a livestock value chain of the livestock, wherein the livestock value chain is a chain of activities to produce and deliver commodities based on the livestock.

16. The computer program product of claim 15, wherein the machine learning model is an abattoir readiness model, the prediction data is a predicted yield of the livestock over a timeframe, and the program instructions are executable by the processor to cause the device to:
extract features of the livestock from the digital representation;
train the abattoir readiness model using the extracted features; and
run the abattoir readiness model to generate the predicted yield of the livestock over the timeframe.

17. The computer program product of claim 15, wherein the machine learning model is an environmental footprint model, the prediction data is an environmental footprint forecast, and the program instructions are executable by the processor to cause the device to:
receive data relating to the type of livestock from a plurality of data sources;
train the environmental footprint model using the received data and the digital representation of the livestock; and
run the environmental footprint model to generate the environmental footprint forecast.

18. The computer program product of claim 15, wherein the program instructions are executable by the processor to cause the device to:
compare the determined location with the GPS coordinates;
based on a result of the comparison, map the set of pixels to the identifier to assign the set of pixels as the digital representation of the livestock; and
generating livestock data based on the determined type of livestock being represented by the received image.

19. The computer program product of claim 15, wherein the machine learning model is a behavior model, and the prediction data is breeding prediction data, and the program instructions are executable by the processor to cause the device to: receive additional images captured in a series of times, said additional images including the set of pixels;
determine a plurality of locations of the set of pixels with respect to the geographical region;
receive a plurality of global positioning system (GPS) data generated at the series of times, the GPS data including an identifier and a plurality of GPS coordinates at the series of times;
compare the plurality of locations with the plurality of GPS coordinates;
based on a result of the comparison, track a movement of the livestock over the series of times;
determine interaction between the livestock and other livestock based on the tracked movement;
train the behavior model using the tracked movement, wherein the behavior model projects behaviors and interactions between different livestock; and
run the behavior model to generate the breeding prediction data relating to the livestock.

20. The computer program product of claim 15, wherein the machine learning model is a supply and demand model, the prediction data is a supply and demand forecast of the livestock, and the program instructions are executable by the processor to cause the device to:
run an environmental footprint model to output environmental footprint data of the livestock;
receive value chain data related to the livestock value chain; and
train the supply and demand model relating to the livestock using the environmental footprint data of the livestock; and
run the supply and demand model to generate the supply and demand forecast.

* * * * *